United States Patent
Kaiser et al.

(10) Patent No.: US 11,794,556 B2
(45) Date of Patent: *Oct. 24, 2023

(54) SYSTEM AND METHOD OF ENERGY EFFICIENT OPERATION OF A TRANSPORT CLIMATE CONTROL SYSTEM

(71) Applicant: THERMO KING LLC, Minneapolis, MN (US)

(72) Inventors: Joseph R. Kaiser, Cottage Grove, MN (US); Lars I. Sjoholm, Burnsville, MN (US); Panayu Robert Srichai, Minneapolis, MN (US); David J. Dykes, Eagan, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,594

(22) Filed: Mar. 9, 2022

(65) Prior Publication Data
US 2022/0194176 A1    Jun. 23, 2022

Related U.S. Application Data

(63) Continuation of application No. 16/863,051, filed on Apr. 30, 2020, now Pat. No. 11,273,687.

(51) Int. Cl.
*B60H 1/32*    (2006.01)

(52) U.S. Cl.
CPC ........... *B60H 1/3211* (2013.01); *B60H 1/323* (2013.01); *B60H 1/3226* (2013.01); *B60H 2001/3283* (2013.01)

(58) Field of Classification Search
CPC .... B60H 1/3211; B60H 1/3226; B60H 1/323; B60H 2001/3283; F25B 1/10;
(Continued)

(56) References Cited

U.S. PATENT DOCUMENTS 5,582,022 A    12/1996    Heinrichs et al.
7,228,707 B2    6/2007    Lifson et al.
(Continued)

FOREIGN PATENT DOCUMENTS

WO    2019/093420    5/2019
WO    2019/093422    5/2019

OTHER PUBLICATIONS

Extended European Search Report, issued in the corresponding European patent application No. 21171448.0, dated Oct. 5, 2021, 9 pages.

*Primary Examiner* — Marc E Norman
(74) *Attorney, Agent, or Firm* — Hamre, Schumann, Mueller & Larson, P.C.

(57) ABSTRACT

A climate control circuit for a transport climate control system is provided. The circuit includes a compressor, a plurality of evaporators, a suction flow control device, and a controller. The suction flow control device is downstream of the plurality of evaporators and directs the working fluid from each of the evaporators to one of a main suction port and an auxiliary port of the compressor. The controller determines whether each of the evaporators is operating in a fresh temperature range or in a frozen temperature range. For each of the evaporators operating in the fresh temperature range, the controller instructs the suction flow control device to direct the working fluid from the corresponding evaporator to the auxiliary suction port. For each of the plurality of evaporators operating in the frozen temperature range, the controller instructs the suction flow control device to direct the working fluid to the main suction port.

19 Claims, 4 Drawing Sheets

(58) Field of Classification Search
CPC .............. F25B 41/22; F25B 2313/0233; F25B 2313/02331; F25D 11/003; F25D 11/022
See application file for complete search history.

(56) References Cited

U.S. PATENT DOCUMENTS

| | | |
|---|---|---|
| 7,325,414 B2 | 2/2008 | Taras et al. |
| 7,353,660 B2 | 4/2008 | Lifson et al. |
| 9,933,188 B2 | 4/2018 | Lim et al. |
| 10,612,820 B2 | 4/2020 | Takizawa |
| 11,273,687 B2 * | 3/2022 | Kaiser .................... B60H 1/323 |
| 2007/0144190 A1 | 6/2007 | Temmyo et al. |
| 2007/0163276 A1 | 7/2007 | Braun et al. |
| 2010/0058781 A1 * | 3/2010 | Lifson ....................... F25B 1/10 |
| | | 62/79 |
| 2010/0107661 A1 | 5/2010 | Awwad et al. |
| 2010/0132399 A1 | 6/2010 | Mitra et al. |
| 2018/0195794 A1 | 7/2018 | Saunders et al. |
| 2019/0264973 A1 | 8/2019 | Koelsch |
| 2019/0212038 A1 | 11/2019 | Senf, Jr. |

* cited by examiner

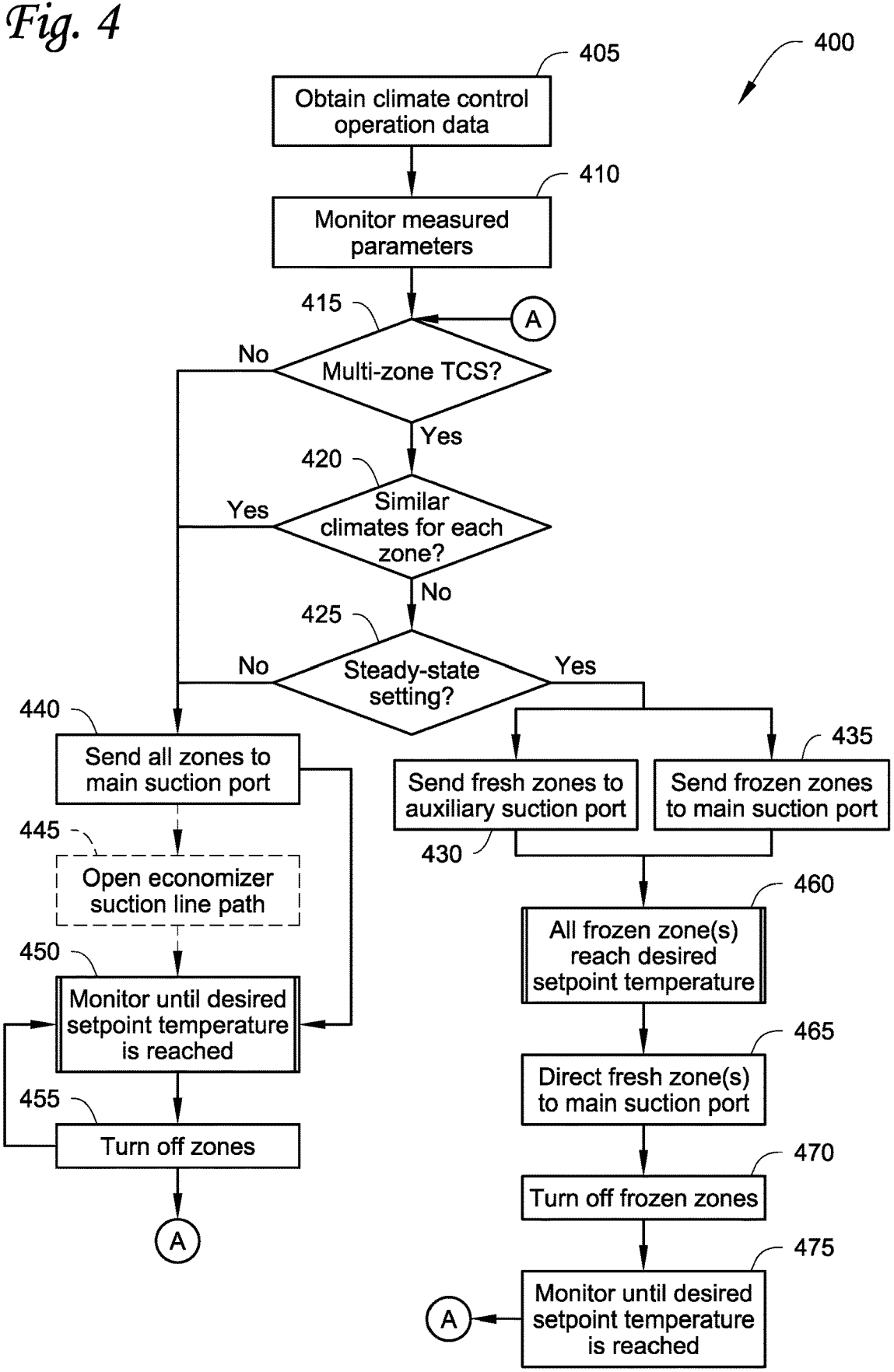

SYSTEM AND METHOD OF ENERGY EFFICIENT OPERATION OF A TRANSPORT CLIMATE CONTROL SYSTEM

FIELD

The disclosure herein relates to a transport climate control system. More particularly, the disclosure herein relates to a system and method of energy efficient operation of a transport climate control system.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

In some embodiments, the transport climate control system can be a multi-zone transport climate control system (MTCS). The MTCS can be used to separately and independently control environmental condition(s) within each of the multiple zones of the climate controlled space. The MTCS can include a host unit, and one or more remote units that may be provided in different locations of the transport unit for separate climate control within each of the zones. In some instances, the MTCS can have two or more remote units without a host unit.

SUMMARY

The embodiments disclosed herein relate to a transport climate control system. More particularly, the embodiments disclosed herein relate to a system and method of energy efficient operation of a transport climate control system.

In particular, the embodiments described herein can optimize efficiency of the transport climate control system by dynamically and independently controlling the flow refrigerant from each of a plurality of evaporators to either an auxiliary suction port or a main suction port of a compressor. Thus, working fluid gas from each of the evaporators can be prevented from mixing. This can allow each of the evaporators to operate at or near saturation. Accordingly, a cooling capacity of the entire transport climate control system and thereby the energy efficiency of the transport climate control system can be improved. In some instances, the embodiments described herein can provide 10-20% energy/fuel savings over a conventional transport climate control system in which the working fluid gas exiting each of the evaporators is returned to the main suction port of the compressor.

The embodiments described herein can provide an improved layout of solenoid valves, check valves and tubing between each zone's evaporator and a compressor of the transport climate control system to allow each evaporator to send working fluid gas to either the main suction compressor port or the auxiliary suction port in a manner that allows each of the evaporators to operate at or near saturation.

The embodiments described herein can be implemented in a single-zone transport climate control system with multiple evaporators that provides climate control within a climate controlled space or a multi-zone climate control system with multiple evaporators that provides separate and independent climate control within different zones of the climate controlled space.

The embodiments described herein can be used with any positive displacement compressor that can compress working fluid in multiple (i.e., two or more) stages/suction pressure levels. Examples of positive displacement compressors that may be used in the embodiments described herein can include, for example, a screw compressor, a scroll compressor, a reciprocating compressor, etc. In some embodiments, the compressor can be a single stage compressor with one or multiple auxiliary suction ports. In other embodiments, the compressor can be a two stage compressor with an auxiliary suction port provided between the first stage and the second stage of the two stage compressor. The compressor can perform side loading in which the compressor receives working fluid in a gaseous form at a pressure that is higher than a normal suction pressure, but lower than the compressor's discharge pressure. By returning this intermediate pressure working fluid gas to an auxiliary suction port of the compressor can allow the compressor to operate more efficiently. In some instances, the embodiments described herein can provide about 10-20% energy/fuel savings over a system in which all of the working fluid is sent to the main suction port.

Also, the embodiments described herein can be used with a non-positive displacement compressor (e.g., a multistage micro turbo compressor, a multistage micro centrifugal compressor, etc.), whereby working fluid can enter the compressor between stages of the compressor so as to allow working fluid at different pressures (e.g., via a main suction port and via between two stages of the compressor) to enter the compressor to allow the compressor to operate more efficiently.

An advantage of these embodiments is that lower pressure working fluid from lower temperature zone(s) can be prevented from mixing with higher pressure working fluid from higher temperature zone(s). Further, these embodiments can prevent the working fluid from being disproportionately directed to the evaporator operating in a fresh temperature range than the evaporator operating in a frozen temperature range due to an elevated suction pressure. Accordingly, the cooling capacity of the climate control circuit and the energy efficiency for providing the desired climate in the climate controlled space can be improved. These embodiments can provide these advantages without requiring additional valves or complexity in the climate control circuit. Also, these embodiments can maintain zone flexibility (e.g., the ability to change the desired set-point temperatures within each of the zones) between different zones of the climate controlled space.

In one embodiment, a climate control circuit for a transport climate control system that provides climate control to a climate controlled space of a transport unit is provided. The climate control circuit includes a compressor, a condenser, a plurality of expansion valves, a plurality of evaporators, a suction flow control device, and a controller. The compressor compresses working fluid and includes a discharge port that discharges working fluid out of the compressor, a main suction port that receives a first pressure working fluid, and an auxiliary suction port that receives a second pressure working fluid that is greater than the first pressure working fluid. The condenser is downstream of the compressor and releases heat from the working fluid into ambient air outside of the transport unit to cool and condense the working fluid. The plurality of expansion valves is downstream of the condenser. Each of the plurality of expansion valves controls the amount of the working fluid directed to a corresponding evaporator of the plurality of evaporators. Each of the plurality of evaporators is downstream of a corresponding expansion valve of the plurality of expansion valves. Also, each of the plurality of evaporators absorbs heat from a different area of the climate controlled space to heat and evaporate the working fluid. The suction flow control device is downstream of each of the plurality of evaporators and directs the working fluid from each of the plurality of evaporators to one of the main suction port and the auxiliary port. The controller determines whether each of the plurality of evaporators is operating to provide climate control within a fresh temperature range or operating to provide climate control within a frozen temperature range. For each of the plurality of evaporators operating to provide climate control within the fresh temperature range, the controller instructs the suction flow control device to direct the working fluid from the corresponding evaporator to the auxiliary suction port. For each of the plurality of evaporators operating to provide climate control within the frozen temperature range, the controller instructs the suction flow control device to direct the working fluid to the main suction port.

In another embodiment, a method for operating a climate control circuit of a transport climate control system that provides climate control to a climate controlled space of a transport unit is provided. The method includes obtaining climate control operation data for the transport climate control system. The method also includes monitoring a measured parameter within the transport unit. Also, the method includes a controller determining whether each of a plurality of evaporators is operating to provide climate control within a fresh temperature range or operating to provide climate control within a frozen temperature range. Further, the method includes the controller instructing a suction flow control device downstream of the corresponding evaporator to direct the working fluid from the corresponding evaporator to the auxiliary suction port for each of the plurality of evaporators operating to provide climate control within the fresh temperature range. Moreover, the method includes the controller instructing the suction flow control device to direct the working fluid to the main suction port for each of the plurality of evaporators operating to provide climate control within the frozen temperature range, the controller instructing the suction flow control device to direct the working fluid to the auxiliary suction port.

Other features and aspects will become apparent by consideration of the following detailed description and accompanying drawings.

BRIEF DESCRIPTION OF THE DRAWINGS

FIG. 4 illustrates a flowchart of a method for operating a climate control circuit, according to one embodiment.

DETAILED DESCRIPTION

The embodiments disclosed herein relate to a transport climate control system. More particularly, the embodiments disclosed herein relate to a system and method of energy efficient operation of a transport climate control system.

Figure 1:
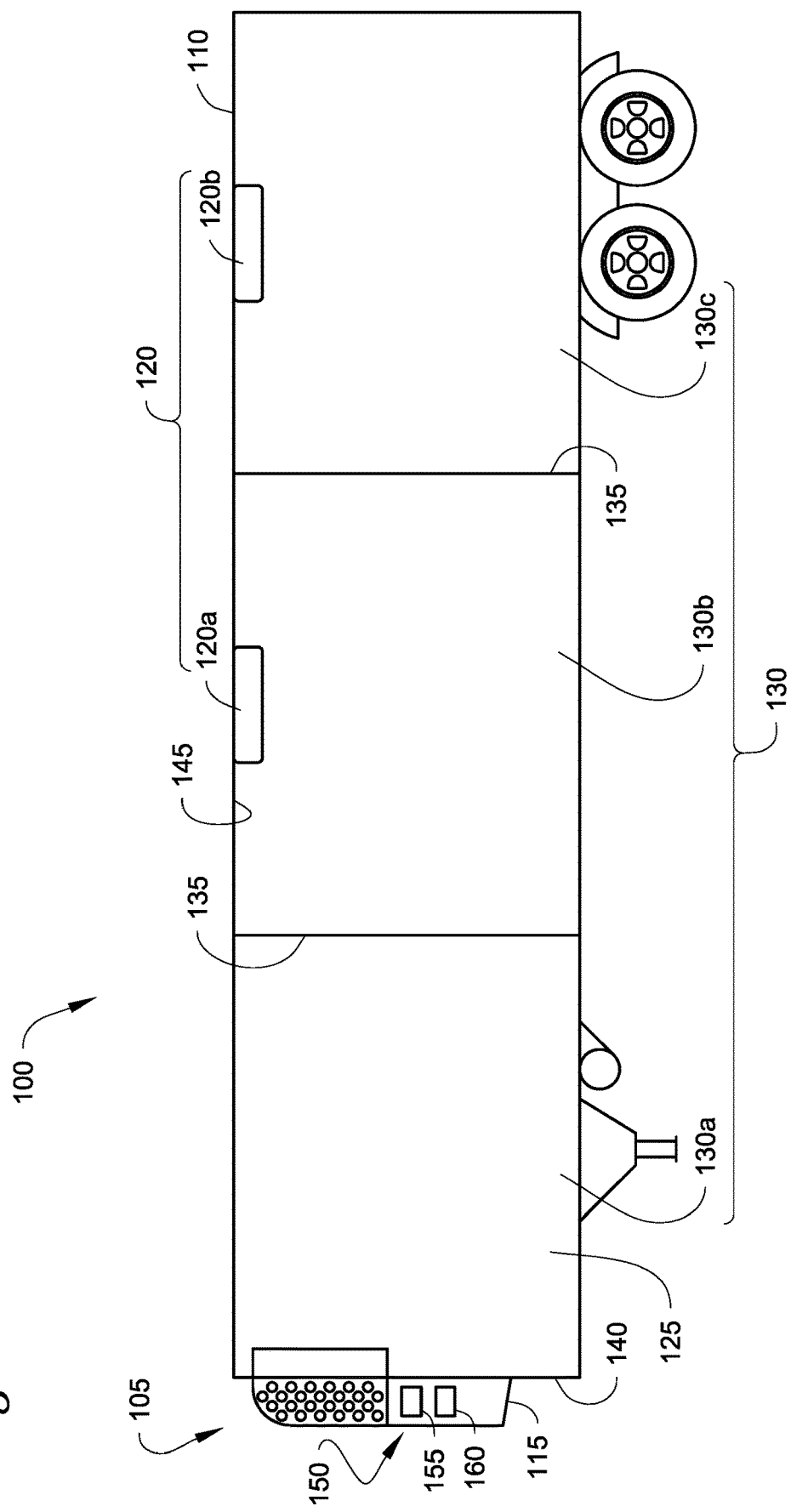
FIG. 1 illustrates a schematic cross sectional side view of a climate controlled transport unit with a climate control system, according to one embodiment.

FIG. 1 illustrates an embodiment of a climate controlled transport unit 100. The climate controlled transport unit 100 includes a transport climate control system (TCS) 105 for a transport unit 110 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The TCS 105 includes a transport climate control unit (CCU) 115 and a plurality of remote units 120 that provide environmental control (e.g. temperature, humidity, air quality, etc.) within a climate controlled space 125 of the transport unit 110. In some embodiments, the climate controlled space 125 can operate as a single zone such that the TCS 105 provides a climate condition(s) throughout the entire climate controlled space 125. In these embodiments, the CCU 115 and the remote units 120 work together to control environmental condition(s) within the entire climate controlled space 125.

In some embodiments, the climate controlled space 125 can be divided into a plurality of zones 130 separated by optional walls 135. In these embodiments, the CCU 115 can operate as a host unit and provide independent climate control within a first zone 130a of the climate controlled space 125. The remote unit 120a can provide independent climate control within a second zone 130b of the climate controlled space 125. The remote unit 120b can provide independent climate control within a third zone 130c of the climate controlled space 125. Accordingly, the TCS 105 can be used to separately and independently control environmental condition(s) within each of the multiple zones 130 of the climate controlled space 125.

The CCU 115 is disposed on a front wall 140 of the transport unit 110. In other embodiments, it will be appreciated that the CCU 115 can be disposed, for example, on a rooftop or another wall of the transport unit 110. The CCU 115 includes a climate control circuit (see FIG. 2) that connects, for example, a compressor, a condenser, a first expansion valve, a first evaporator, and a first suction flow control device to provide conditioned air within the climate controlled space 125. The remote unit 120a is disposed on a ceiling 145 within the second zone 130b and the remote unit 120b is disposed on the ceiling 145 within the third zone 130c. The remote unit 120a includes a second expansion valve (not shown), a second evaporator (not shown) and a second suction flow control device (not shown) that connects to the rest of the climate control circuit provided in the CCU 115. Similarly, the remote unit 120b includes a third expansion valve (not shown), a third evaporator (not shown) and a third suction flow control device (not shown) that connects to the rest of the climate control circuit provided in the CCU 115. It will be appreciated that in some embodiments, the second and third expansion valves and/or the second and third suction flow control devices can be housed within the CCU 115.

The TCS 105 also includes a programmable climate controller 150 and one or more sensors (not shown) that are configured to measure one or more parameters of the TCS 105 (e.g., an ambient temperature outside of the transport unit 110, an ambient humidity outside of the transport unit 110, suction pressures of working fluid at the outlet of an evaporator coil provided in the CCU 115 and the remote units 120 (i.e., evaporator pressure), a compressor discharge pressure, supply air temperatures of air supplied by the CCU 115 and the remote units 120 into each of the zones 130, return air temperatures of air returned from each of the zones 130 back to the respective CCU 115 or remote unit 120a or 120b, evaporator coil temperatures of an evaporator coil provided in the CCU 115 and the remote units 120, a humidity within each of the zones 130, etc.) and communicate parameter data to the climate controller 150. The climate controller 150 is configured to control operation of the TCS 105 including components of the climate control circuit. The climate controller 150 may comprise a single integrated control unit 155 or may comprise a distributed network of climate controller elements 155, 160. The number of distributed control elements in a given network can depend upon the particular application of the principles described herein.

The TCS 105 can operate in multiple operation modes including, for example, a continuous cooling mode, a cycle-sentry or start/stop cooling mode, a heating mode, a defrost mode, a null mode, etc. When operating in a continuous cooling mode and/or a cycle-sentry cooling mode, the TCS 105 can operate in a pulldown setting and in a steady-state setting. The pulldown setting generally occurs when, for example, the climate controlled space 125 or the zone(s) 130 are being cooled from an ambient temperature down to the desired set-point temperature so that the TCS 105 can bring the temperature down to the desired set-point temperature as quickly as possible. The steady-state setting generally occurs when, for example, the climate the climate controlled space 125 or the zone(s) 130 have already reached or is close to approaching the desired set-point temperature and the TCS 105 is working to maintain the desired set-point temperature.

Figure 2:
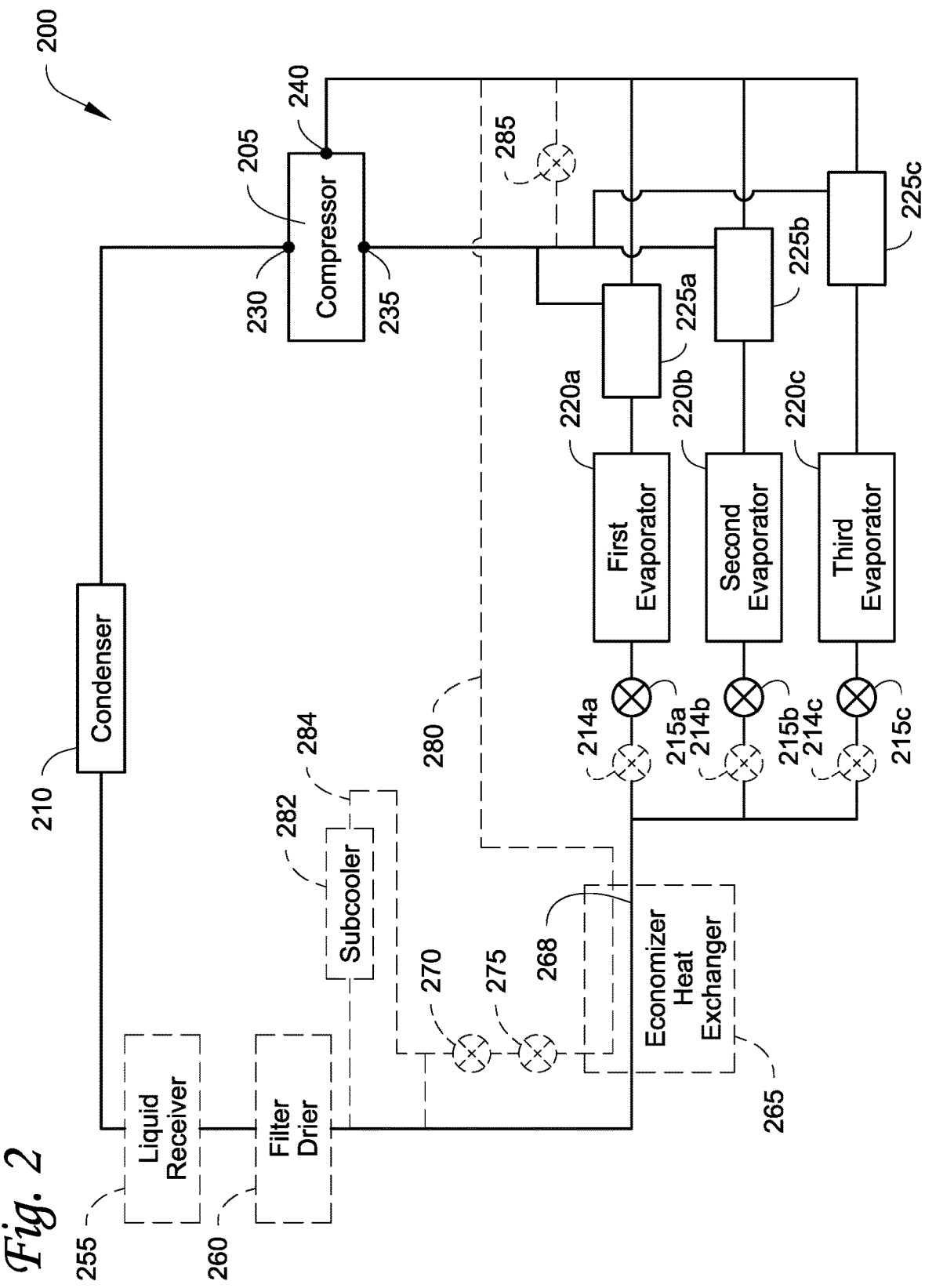
FIG. 2 illustrates a schematic of a climate control circuit for a transport climate control system that includes multiple evaporators, according to one embodiment.

FIG. 2 illustrates a schematic of a climate control circuit 200 for a transport climate control system that includes multiple evaporators, such as the TCS 105 shown in FIG. 1.

The climate control circuit 200 includes a compressor 205, a condenser 210, a plurality of expansion valves 215, a plurality of evaporators 220 and a plurality of suction flow control devices 225. In some embodiments, the climate control circuit 200 can optionally include one or more of a liquid receiver 255, a filter drier 260 and an economizer heat exchanger 265. In embodiments when the climate control circuit 200 includes an optional economizer heat exchanger 265, the climate control circuit 200 typically also includes an economizer suction line path 280 with an economizer suction line solenoid valve 270 and an economizer suction line expansion valve 275 upstream of the economizer heat exchanger 265. In some embodiments, the climate control circuit 200 can also optionally include an auxiliary suction port bypass valve 285.

The compressor 205 can be any type of compressor that can compress working fluid in multiple (i.e., two or more) stages/suction pressure levels. In some embodiments, the compressor 205 can be a positive displacement compressor. Examples of positive displacement compressors that may be used in the embodiments described herein can include, for example, a screw compressor, a scroll compressor, a reciprocating compressor, etc. In some embodiments, the compressor 205 can be a non-positive displacement compressor. Examples of non-positive displacement compressors that may be used in the embodiments described herein can include, for example, a multistage micro turbo compressor, a multistage micro centrifugal compressor, etc. The compressor 205 shown in FIG. 2 is a single stage compressor with an auxiliary suction port 240. However, in other embodiments, the compressor 205 can be a two stage compressor with an auxiliary suction port provided between the first stage and the second stage of the two stage compressor. Working fluid as defined here can refer to any type of fluid that has thermodynamic properties and undergoes phase transitions from a liquid to a gas and back again as it passes through the climate control circuit. In some embodiments, the working fluid is a refrigerant.

The compressor 205 drives the climate control circuit 200 by compressing a working fluid (e.g., refrigerant) and directing the working fluid through the climate control circuit 200. The compressor 205 includes a discharge port 230 that directs compressed working fluid out of the compressor 205 and through the climate control circuit 200, a main suction port 235 that receives working fluid that is typically in a gaseous form, and an auxiliary suction port 240 that receives working fluid that is typically in a gaseous form and having a higher pressure than the working fluid received by the main suction port 235. When the climate control circuit 200 includes the optional economizer heat exchanger 265, the auxiliary suction port 240 can optionally receive working fluid that has bypassed the evaporator 220 in order to provide further subcooling of the climate control circuit 200. It will be appreciated that in some embodiments, at different operating conditions, the capacity of the auxiliary suction port 240 on the compressor 205 and the amount of working fluid that can be accepted in the auxiliary suction port 240 can vary. Operation of the compressor 205 can be controlled by a controller (not shown) (e.g., the programmable climate controller 150 shown in FIG. 1). Also, in some embodiments, the compressor 205 can include two or more auxiliary suction ports that can receive working fluid at different pressures and thereby allow the compressor 205 to compress the working fluid at different pressure levels.

The condenser 210 is positioned downstream of the compressor 205 and receives working fluid discharged from the compressor 205. The condenser 210 releases heat from the working fluid passing there through into ambient air outside of a transport unit (e.g., the transport unit 110 shown in FIG. 1) to cool and condense the working fluid. The working fluid is then directed to the expansion valve 215.

The plurality of expansion valves 215 are positioned downstream of the condenser 210 and each controls an amount of working fluid directed to a respective one of the plurality of evaporators 220. For example, a first expansion valve 215a controls an amount of working fluid directed to a first evaporator 220a, a second expansion valve 215b controls an amount of working fluid directed to a second evaporator 220b, and a third expansion valve 215c controls an amount of working fluid directed to a third evaporator 220c. In some embodiments, each of the expansion valves 215 can be a thermostatic or electric expansion valve. The expansion valves 210 can be controlled by, for example, the controller to meter the amount of working fluid directed to each of the evaporators 220 in order to maintain superheat of the working fluid to a stable value and to help maximize the optimal heat exchange of each of the evaporators 220. The working fluid is then directed from each of the expansion valves 215 to the respective evaporator 220a,b,c.

In some embodiments, when the expansion valves 215a, b,c are thermostatic expansion valves, a plurality of optional liquid line solenoid valves 214 are provided upstream of the expansion valves 215. Each of the optional liquid line solenoid valves 214a,b,c, when closed, can shut off the flow of working fluid to a corresponding downstream expansion valve 220 and evaporator 220. The plurality of optional liquid line solenoid valves 214 can be controlled by the controller to open and close depending on, for example, whether climate control is required to a particular zone (e.g., the zones 130 shown in FIG. 1). When climate control is required for a particular zone, the controller can instruct the liquid line solenoid valve 214 that is in fluid communication with the evaporator 220 providing climate control for that zone to open. When climate control is not required for a particular zone, the controller can instruct the liquid line solenoid valve 214 that is in fluid communication with the evaporator 220 providing climate control for that zone to close. It will be appreciated that when any of the expansion valves 215 is an electric expansion valve, the corresponding solenoid valve 214 is not required and may not be provided.

The plurality of evaporators 220 are positioned downstream of the expansion valves 215 such that each of the evaporators 220a,b,c receives working fluid from the respective expansion valve 215a,b,c. Each of the evaporators 220a,b,c absorbs heat from the climate controlled space (e.g., the climate controlled space 125 shown in FIG. 1) to heat and evaporate the working fluid. The working fluid is then directed from each of the evaporators 220a,b,c to the respective suction flow control device 225a,b,c. Each of the evaporators 220 can be disposed within a different zone of a climate controlled space. Also, the evaporators 220 can be disposed within a CCU (e.g., the CCU 105 shown in FIG. 1) or within a remote unit (e.g., the remote units 120a,b shown in FIG. 1). For example, in one embodiment, the first evaporator 220a can be disposed within a CCU and provide climate control to a first zone (e.g., the zone 130a shown in FIG. 1), the second evaporator 220b can be disposed within a first remote unit and provide climate control to a second zone (e.g., the zone 130b shown in FIG. 1), and the third evaporator 220c can be disposed within a second remote unit and provide climate control to a third zone (e.g., the zone 130c shown in FIG. 1).

The plurality of suction flow control devices 225 are positioned downstream of the evaporators 220 and respectively direct the working fluid to one of the main suction port 235 and the auxiliary suction port 240. For example, a first suction flow control device 225a receives working fluid from the first evaporator 220a and then directs the working fluid to one of the main suction port 235 and the auxiliary suction port 240. Similarly, a second suction flow control device 225b receives working fluid from the second evaporator 220b and then directs the working fluid to one of the main suction port 235 and the auxiliary suction port 240. Also, a third suction flow control device 225c receives working fluid from the third evaporator 220c and then directs the working fluid to one of the main suction port 235 and the auxiliary suction port 240. In some embodiments, the controller can instruct each of the suction flow control devices 225 independently to direct the working fluid to the main suction port 235 or to the auxiliary suction port 240. Operation of the suction flow control devices 225 and more generally the climate control circuit 200 is discussed below with respect to FIG. 4.

In some embodiments, the plurality of suction flow control devices 225 can be replaced with a single suction flow control device (not shown) that is positioned downstream of each of the evaporators 220 and can independently direct the working fluid from each of the evaporators 220 to one of the main suction port 235 and the auxiliary suction port 240 based on, for example, the method 400 described below with respect to FIG. 4. The single suction flow control device can be comprised of, for example, multiple independent suction flow control devices (e.g., the suction flow control devices 225).

Figure 3A:
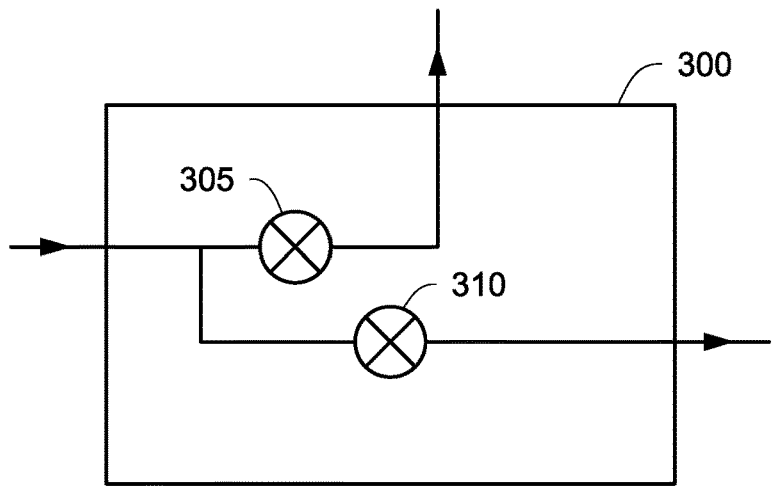
FIGS. 3A-C illustrate three different embodiments of a suction flow control device.
Figure 3B:
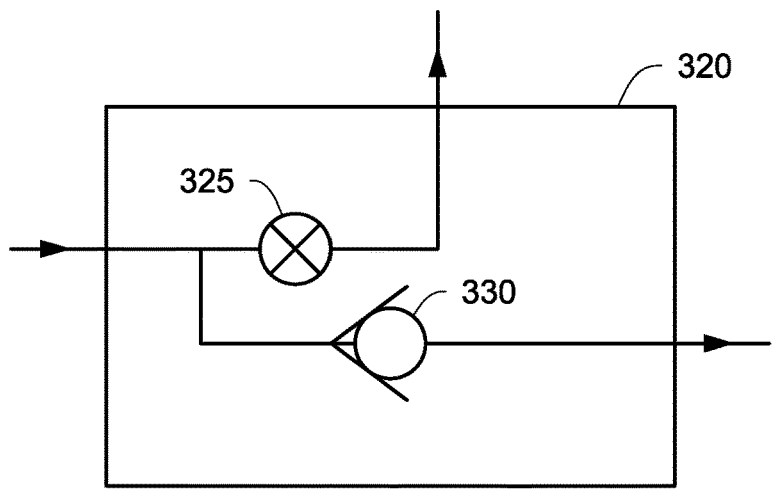
Figure 3C:
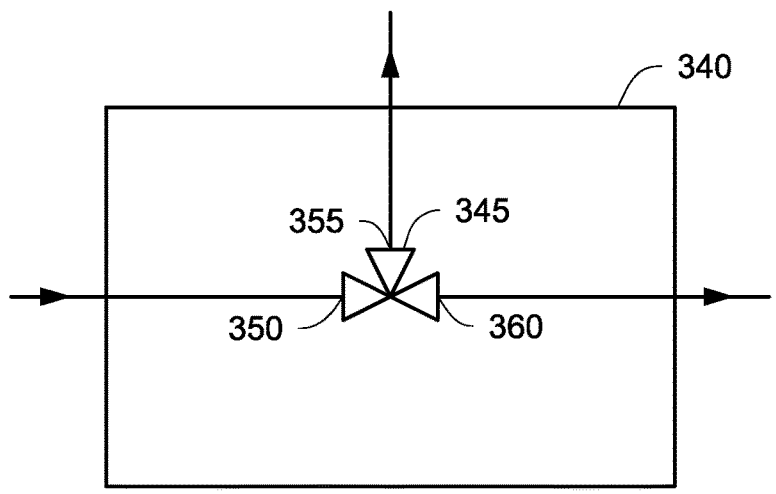

FIGS. 3A-C illustrate three different embodiments of a suction flow control device 300, 320, 330 (e.g., the suction flow control devices 235 shown in FIG. 2). FIG. 3A shows the suction flow control device 300 having a main suction port solenoid valve 305 and an auxiliary suction port solenoid valve 310 that both can be controlled by a controller (e.g., the programmable climate controller 150 shown in FIG. 1). In some embodiments, the controller can instruct the main suction port solenoid valve 305 to open and instruct the auxiliary suction port solenoid valve 310 to close when the working fluid is to be directed to a main suction port of a compressor (e.g., the main suction port 235). Similarly, the controller can instruct the main suction port solenoid valve 305 to close and instruct the auxiliary suction port solenoid valve 310 to open when the working fluid is to be directed to an auxiliary suction port of a compressor (e.g., the auxiliary suction port 240).

FIG. 3B shows the suction flow control device 320 having a solenoid valve 325 and a check valve 330, whereby the solenoid valve 325 can be controlled by a controller (e.g., the programmable climate controller 150 shown in FIG. 1). In some embodiments, the controller can instruct the solenoid valve 325 to open when the working fluid is to be directed to a main suction port of a compressor (e.g., the main suction port 235). When the solenoid valve 325 is open, pressure differences between the main suction port and the auxiliary suction port prevents working fluid from passing through the check valve 330. Similarly, the controller can instruct the solenoid valve 325 to close when the working fluid is to be directed to an auxiliary suction port of a compressor (e.g., the auxiliary suction port 240). With the solenoid valve 325 closed, the working fluid is forced to go through the check valve 330 and towards the auxiliary suction port. Also, the check valve 330 can prevent working fluid from travelling in an opposite direction as intended. That is, the check valve 330 can prevent working fluid from travelling from the auxiliary suction port back through the suction flow control device 320 and back to an evaporator (e.g., the evaporators 220a,b,c shown in FIG. 2).

FIG. 3C shows the suction flow control device 340 having a three-way valve 345 that can be controlled by a controller (e.g., the programmable climate controller 150 shown in FIG. 1). The three-way valve 345 includes an input port 350, a main output port 355 and an auxiliary output port 360. In some embodiments, the controller can instruct the three-way valve 345 to open the main output port 355 and instruct the auxiliary output port 360 to close when the working fluid is to be directed to a main suction port of a compressor (e.g., the main suction port 235). Similarly, the controller can instruct the three-way valve 345 to close the main output port 355 and open the auxiliary output port 360 when the working fluid is to be directed to an auxiliary suction port of a compressor (e.g., the auxiliary suction port 240).

Returning to FIG. 2, it will be appreciated that the suction flow control devices 225 are not limited to the embodiments shown in FIGS. 3A-C and can use other types of valves and devices such that the controller can direct working fluid to either the main suction port 235 or the auxiliary suction port 240.

In some embodiments, the climate control circuit 200 optionally includes a liquid receiver 255 that is positioned between the condenser 210 and the expansion valve 215. The liquid receiver 255 can hold working fluid within the climate control circuit 200. In some embodiments, the climate control circuit 200 optionally includes a filter drier 260 that is positioned between the condenser 210 (and optionally the liquid receiver 255) and the expansion valve 215. The filter drier 260 can adsorb system contaminants, such as water, from the working fluid and can provide dehumidification and physical filtration of the working fluid.

Also, in some embodiments, the climate control circuit 200 optionally includes a subcooler 282 positioned along an optional subcooling path 284. The optional subcooling path 284 can provide further subcooling to the working fluid exiting the condenser 210 prior to being directed to the evaporators 220. In some embodiments, the subcooler 282 could be complemented by or replaced with a suction to liquid heat exchanger (not shown). This can help increase the amount of working fluid in the liquid phase directed to the expansion valve s 215 and prevent working fluid in the gas phase from entering the expansion valves 215.

In some embodiments, the climate control circuit 200 optionally includes the economizer heat exchanger 265 with an economizer suction line path 280. The optional economizer heat exchanger 265 is positioned between the condenser (and optionally the optional drier 260) and the plurality of expansion valves 215. The optional economizer heat exchanger 265 can provide additional subcooling to the working fluid prior to the working fluid being directed to the expansion valve 215. The optional economizer suction line path 280 directs a portion of the working fluid through the economizer heat exchanger 265 and then bypasses the expansion valves 215 and the evaporators 220 and connects to the auxiliary suction port 240. The economizer suction line path 280 includes the economizer suction line valve 270 and the thermal expansion valve 275 that are provided to control the total capacity of the climate control circuit through mechanical subcooling of the working fluid passing through the economizer suction line path 280. As shown in FIG. 2, the economizer suction line valve 270 and the thermal expansion valve 275 are positioned upstream of the economizer heat exchanger 265. However, in some embodiments, the economizer suction line valve 270 and the thermal expansion valve 275 can be positioned downstream of the economizer heat exchanger 265. Also, in some embodiments, the economizer suction line valve 270 and the thermal expansion valve 275 can be replaced with an electric expansion valve. The economizer suction line valve 270 can be controlled by the controller to open and close depending on whether subcooling is desired. The thermostatic or electric expansion valve 275 can be controlled by the controller to meter the amount of working fluid directed along the economizer suction line path 280. The remaining portion of the working fluid passes through an economizer path 268 of the economizer heat exchanger 265 and is directed to the expansion valve 215. The working fluid travelling through the economizer path 268 is subcooled by undergoing a heat exchange with the working fluid travelling through the economizer suction line path 280.

Also, in some embodiments, the climate control circuit 200 includes an optional auxiliary suction port bypass valve 285. The controller can instruct the optional auxiliary suction port bypass valve 285 to open and close. When the auxiliary suction port bypass valve 285 is opened, working fluid being directed from the auxiliary suction port 240 can be redirected to the main suction port 235.

FIG. 4 illustrates a flowchart of a method 400 for operating a climate control circuit (e.g., the climate control system 200 shown in FIG. 2) of a TCS (e.g., the TCS 105 shown in FIG. 1) for a climate controlled transport unit (e.g., the climate controlled transport unit 100 shown in FIG. 1), according to one embodiment. The method 400 begins at 405, whereby the controller obtains climate control operation data for the TCS. The climate control operation data can include, for example, information regarding whether the TCS is being operated as a multi-zone TCS or a single zone TCS, a desired set-point temperature for each of the zone(s), fresh/frozen zone data indicating whether the zone(s) are operating as a fresh temperature zone or a frozen temperature zone, cargo being stored in the zone(s), current operation mode of the TCS, pulldown/steady-state setting status, etc. In some embodiments, the climate control operation data can be input into the controller, for example, by a user or customer shipping cargo in the climate controlled transport unit. In some embodiments, the climate control operation data can be retrieved from a memory portion of the controller. The method 400 then proceeds to 410.

At 410, the controller monitors one or more measured parameters (e.g., an ambient temperature outside of the transport unit, an ambient humidity outside of the transport unit, a suction pressure of working fluid at the outlet of each of the evaporators coils provided in the CCU and/or remote units, a compressor discharge pressure, a return air temperature for each of the zones, a supply air temperature for each of the zones, an evaporator coil temperature for each of the evaporator coils provided in the CCU and/or remote units, etc.) that can impact climate within the climate controlled space of the transport unit (e.g., the climate controlled space 125). When the TCS is operating as a multi-zone TCS, the controller can monitor one or more measured parameters from each of the zones of the climate controlled space. In some embodiments, the controller can obtain measured temperature data and/or pressure data from a plurality of return air temperature sensors and/or a plurality of return air pressure sensors provided, for example, in each of the zones that monitor the temperature of air returning to a CCU (e.g., the CCU 115 shown in FIG. 1) or a remote unit (e.g., the remote units 120 shown in FIG. 1) from each of the zones. In some embodiments, the controller can obtain measured temperature data and/or pressure data from a plurality of supply air temperature sensors and/or a plurality of supply air pressure sensors provided, for example, in each of the zones that monitor the temperature of air supplied from a CCU (e.g., the CCU 115 shown in FIG. 1) or a remote unit (e.g., the remote units 120 shown in FIG. 1) from each of the zones. In some embodiments, the controller can obtain measured temperature data from a plurality of evaporator temperature sensors provided, for example, in each of the zones that monitor the temperature of the evaporator coils for each of the evaporators (e.g., the evaporators 220 shown in FIG. 2). In some embodiments, the controller can obtain measured pressure data from a plurality of suction pressure sensors provided, for example, in each of the zones that monitor the suction pressure of working fluid at the output of each of the evaporators. In some embodiments, the controller can obtain measured evaporator coil temperature data from a plurality of evaporator coil temperature sensors provided, for example, with each of the evaporators that monitor the evaporator coil temperature of each of the evaporators. It will be appreciated that the measured parameter data can be obtained during a pulldown setting and/or during a steady state setting. The method 400 then proceeds to 415.

At 415 whereby the controller (e.g., the controller 150 shown in FIG. 1) determines whether multiple zones of the TCS are requesting cooling. That is, the controller determines whether each of the evaporators are operating independently of each other to provide climate control to different zone of the climate controlled space, or whether all of the evaporators are operating in coordination with each other to attempt to provide a uniform climate control within the entire climate controlled space. It the controller determines that the TCS is being operated as a multi-zone TCS, the method 400 proceeds to 420. If the controller determines that the TCS is being operated as a single zone TCS, the method 400 proceeds to 440.

At 420, the controller determines whether the climate control unit or the remote units for each of the zones are operating to provide similar climates based on the measured parameters from each of the zones obtained at 410 and/or the climate control operation data obtained at 405.

For example, in one embodiment, the controller can calculate a difference between the measured parameter data from a first zone with measured parameter data from a second zone. If the difference is greater than a threshold value, the method 400 proceeds to 425. If the difference is less than or equal to the threshold value, the method 400 proceeds to 440. In some embodiments, the measured parameter data is a return air temperature. In some embodiments, the measured parameter data is an evaporator pressure. It will be appreciated that the measured parameter data can be obtained during a pull down setting and/or during a steady-state setting. When the measured parameter data is the return air temperature, the threshold value can be a temperature threshold value set, for example, at a value within a range between 10 and 20° F. When the measured parameter data is the evaporator pressure, the threshold value can be a pressure threshold value set, for example, at a value within a range between 10 and 30 psi. Thus, the controller can determine that the climate control unit or the remote units for each of the zones are operating to provide similar climates when the difference in the measured parameter values is at or below the threshold value.

In another example, in one embodiment, the controller can calculate a difference between modified parameter data from a first zone with modified parameter data from a second zone. If the difference is greater than a threshold value, the method 400 proceeds to 425. If the difference is less than or equal to the threshold value, the method 400 proceeds to 440. In some embodiments, the modified parameter data can be an average air temperature calculated for each zone that is calculated by adding the return air temperature with the discharge air temperature respectively and then dividing the summation in half. When the modified parameter data is an average air temperature, the threshold value can be a temperature threshold value set, for example, within a range between 10 and 20° F.

In some other embodiments, the controller can determine whether the climate control unit or the remote units for each of the zones are operating to provide similar climates based on the fresh/frozen data (obtained at 405). That is, the controller can determine whether the climate control unit or the remote units for each zone are operating to provide a fresh temperature range climate or a frozen temperature range climate. For example, in one embodiment, an evaporator can operate to maintain a desired set-point temperature within a fresh temperature range climate at or above 32° F. and an evaporator can operate to maintain a desired set-point temperature within a frozen temperature range climate of well below 32° F. or about −10° F. to about −40° F. A fresh temperature range climate can maintain fresh cargo such as fruit, vegetables, flowers, pharmaceuticals, etc. A frozen temperature range climate can maintain frozen cargo such as pharmaceuticals, meat, seafood, frozen foods, etc.

Also, in some other embodiments, the controller can determine whether the climate control unit or the remote units for each of the zones are operating to provide similar climates based on a comparison of evaporator coil temperatures for each of the evaporators. For example, the controller can determine that the climate control unit or the remote units for each of the zones are operating to provide similar climates when the difference in evaporator coil temperatures is at or below approximately 10° F.

At 425, the controller determines whether the TCS is operating in a pulldown setting or a steady-state setting based on the climate control operation data obtained at 405. If the controller determines that the TCS is operating in a steady-state setting, the method 400 proceeds concurrently to 430 and 435. If the controller determines that the TCS is operating in a pulldown setting, the method 400 proceeds to 440.

At 440, the controller instructs the suction flow control device(s) (e.g., the suction flow control devices 225 shown in FIG. 2, a single suction flow control device) to independently direct the working fluid from each of the evaporators (e.g., the evaporators 220 shown in FIG. 2) to the main suction port of the compressor (e.g., the main suction port 235 shown in FIG. 2). The method 400 then proceeds back to 410. In some embodiments, the method 400 can optionally proceed to 445 when the climate control circuit includes an economizer and an economizer suction line path (e.g., the economizer suction line path 280 shown in FIG. 2).

At optional 445, the controller can instruct a solenoid valve (e.g., the economizer suction line solenoid valve 270 shown in FIG. 2) to open to allow working fluid to pass through the economizer suction line path. The controller can also control a thermal expansion valve (e.g., the thermal expansion valve 275 shown in FIG. 2) along the economizer suction line path to meter a certain amount of working fluid along the economizer suction line path in order, for example, to provide a constant super heat. The method 400 then proceeds to 450.

At 450, the controller monitors the temperature within each of the zones until the desired set-point temperature is reached. As discussed at 410, the controller can obtain measured temperature data from a plurality of return air temperature sensors provided in each of the zones that monitor the temperature of air returning to a CCU (e.g., the CCU 115 shown in FIG. 1) or a remote unit (e.g., the remote units 120 shown in FIG. 1). When any of the zones reach the desired set-point temperature, the method proceeds to 455.

At 455, when a zone reaches the desired set-point temperature, the controller instructs a liquid line solenoid valve (e.g., the liquid line solenoid valve 214 shown in FIG. 2) corresponding to an expansion valve (e.g., the expansion valves 215 shown in FIG. 2) and an evaporator providing working fluid to the particular zone to close. Accordingly, the flow of working fluid to the corresponding expansion valve and evaporator is shut off and climate control to the zone is turned off. Once the last zone has reached the desired set-point temperature, the controller instructs the liquid line solenoid valve corresponding to the expansion valve and the evaporator providing working fluid to the particular zone to close and the controller instructs the compressor (e.g., the compressor 205 shown in FIG. 2) to turn off.

At 430, the controller instructs the suction flow control device(s) associated with evaporator(s) providing climate control within a fresh temperature range to direct the working fluid from the corresponding evaporator(s) to the auxiliary section port (e.g., the auxiliary suction port 240 shown in FIG. 2). Concurrently, at 435 the controller instructs the suction flow control device(s) associated with evaporator(s) providing climate control within a frozen temperature range to direct the working fluid from the corresponding evaporator(s) to the main suction port (e.g., the main suction port 235 shown in FIG. 2). The method 400 then proceeds to 460.

At 460, the controller monitors the temperature within the zone(s) having evaporator(s) providing climate control within a frozen temperature range (e.g., frozen temperature zone(s)). As discussed at 410, the controller can obtain measured temperature data from a plurality of return air temperature sensors provided in each of the zones that monitor the temperature of air returning to a CCU or a remote unit. When the desired set-point temperature(s) for all of the frozen temperature zone(s) is reached, the method 400 proceeds to 465.

At 465, the controller directs the working fluid passing through the evaporator(s) providing climate control within the fresh temperature range from the auxiliary suction port to the main suction port. In some embodiments, the controller can instruct the suction flow control device associated with the evaporator(s) providing climate control within the fresh temperature range to direct the working fluid from the corresponding evaporator(s) to the main section port. In other embodiments, the controller can instruct an auxiliary suction port bypass valve (e.g., the auxiliary suction port bypass valve 285 shown in FIG. 2) to open such that working fluid being directed to the auxiliary suction port from the suction flow control device associated with the evaporator(s) providing climate control within the fresh temperature range is diverted to the main suction port. This can help prevent damage to the compressor when the suction pressure is approaching a vacuum condition. The method 400 then proceeds to 470.

At 470, once the suction flow control device associated with the evaporator(s) providing climate control within the fresh temperature range is directing the working fluid from the corresponding evaporator(s) to the main suction port, the controller then instructs the liquid line solenoid valve(s) corresponding to the expansion valve(s) and the evaporator(s) providing climate control within the frozen temperature range to close. Accordingly, the flow of working fluid to the corresponding expansion valve(s) and evaporator(s) providing climate control within the frozen temperature range is shut off and climate control to the frozen temperature zone(s) is turned off. Once all of the frozen temperature zone(s) are turned off, the method 400 proceeds to 475.

At 475, the controller monitors the temperature within the zone with the evaporator(s) providing climate control within the fresh temperature range until the desired set-point temperature for each of the fresh temperature zone(s) is reached. As discussed at 410, the controller can obtain measured temperature data from a plurality of return air temperature sensors provided in each of the zones that monitor the temperature of air returning to a CCU or a remote unit. When the evaporator(s) providing climate control within the fresh temperature range reaches the desired set-point temperature, the method 400 proceeds back to 455.

It will be appreciated that the solenoid valves discussed herein (including the liquid line solenoid valves 214, the economizer suction line solenoid valve 270, the auxiliary suction port bypass valve 285, the solenoid valves 305, 310 and 325) when open refers to a state where an orifice of the solenoid valve is nearly fully open (e.g., ~100% open) and when closed refers to a state where the orifice of the solenoid valve is nearly fully closed (e.g., ~0.1% open).

An advantage of these embodiments is that lower pressure working fluid from lower temperature zone(s) can be prevented from mixing with higher pressure working fluid from higher temperature zone(s). Accordingly, the cooling capacity of the climate control circuit and the energy efficiency for providing the desired climate in the climate controlled space can be improved. These embodiments can provide these advantages without requiring additional valves or complexity in the climate control circuit. Also, these embodiments can maintain zone flexibility (e.g., the ability to change the desired set-point temperatures within each of the zones) between different zones of the climate controlled space.

Aspects:

It will be appreciated that any of aspects 1-10 can be combined with any of aspects 11-17.

Aspect 1. A climate control circuit for a transport climate control system that provides climate control to a climate controlled space of a transport unit, the climate control circuit comprising:

a compressor for compressing working fluid, the compressor including a discharge port that discharges working fluid out of the compressor, a main suction port that receives a first pressure working fluid, and an auxiliary suction port that receives a second pressure working fluid that is greater than the first pressure working fluid;

a condenser, downstream of the compressor, that releases heat from the working fluid into ambient air outside of the transport unit to cool and condense the working fluid;

a plurality of expansion valves, downstream of the condenser, each of the plurality of expansion valves controlling the amount of the working fluid directed to a corresponding evaporator of a plurality of evaporators;

the plurality of evaporators, each of the plurality of evaporators downstream of a corresponding expansion valve of the plurality of expansion valves, each of the plurality of evaporators absorbs heat from a different area of the climate controlled space to heat and evaporate the working fluid;

a suction flow control device downstream of each of the plurality of evaporators that directs the working fluid from each of the plurality of evaporators to one of the main suction port and the auxiliary port; and a controller that:
  determines whether each of the plurality of evaporators is operating to provide climate control within a fresh temperature range or operating to provide climate control within a frozen temperature range,
  for each of the plurality of evaporators operating to provide climate control within the fresh temperature range instructs the suction flow control device to direct the working fluid from the corresponding evaporator to the auxiliary suction port, and
  for each of the plurality of evaporators operating to provide climate control within the frozen temperature range instructs the suction flow control device to direct the working fluid to the main suction port.

Aspect 2. The climate control circuit of aspect 1, wherein the suction flow control device is a plurality of independent suction flow control devices, each of the plurality of independent suction flow control devices is downstream of a corresponding evaporator of the plurality of the evaporators, each of the plurality of independent suction flow control devices directs the working fluid from the corresponding evaporator to one of the main suction port and the auxiliary port.

Aspect 3. The climate control circuit of aspect 2, wherein each of the plurality of independent suction flow control devices includes:
  a main suction port solenoid valve configured to open when the working fluid is to be directed to the main suction port and configured to close when the working fluid is to be directed to the auxiliary suction port, and
  an auxiliary suction port solenoid valve configured to open when the working fluid is to be directed to the auxiliary suction port and configured to close when the working fluid is to be directed to the main suction port.

Aspect 4. The climate control circuit of aspect 2, wherein each of the plurality of independent suction flow control devices includes:
  a solenoid valve configured to open when the working fluid is to be directed to the main suction port and configured to close when the working fluid is to be directed to the auxiliary suction port, and
  a check valve configured to prevent the working fluid from travelling from the auxiliary suction port back through the suction flow control device and back to the corresponding evaporator.

Aspect 5. The climate control circuit of aspect 2, wherein each of the plurality of independent suction flow control devices includes a three way valve having an input port, a main output port and an auxiliary output port, wherein the three way valve is configured to open the main output port and close the auxiliary output port when the working fluid is to be directed to the main suction port and configured to close the main output port and open the auxiliary output port when the working fluid is to be directed to the auxiliary suction port.

Aspect 6. The climate control circuit of any one of aspects 1-5, wherein the compressor is a positive displacement compressor configured to compress working fluid in multiple stages.

Aspect 7. The climate control circuit of any one of aspects 1-6, further comprising:
  an economizer heat exchanger downstream of the condenser and upstream of the plurality of evaporators; and
  an economizer suction line path that directs a portion of the working fluid from the economizer heat exchanger to the auxiliary suction port, bypassing the plurality of evaporators and the suction flow control device.

Aspect 8. The climate control circuit of any one of aspects 1-7, further comprising a liquid receiver downstream of the condenser and upstream of the plurality of expansion valves, wherein the liquid receiver holds working fluid within the climate control circuit.

Aspect 9. The climate control circuit of any one of aspects 1-8, further comprising a filter drier downstream of the condenser and upstream of the plurality of expansion valves, wherein the filter drier provides dehumidification and physical filtration of system contaminants from the working fluid.

Aspect 10. The climate control circuit of any one of aspects 1-8, wherein the compressor includes a second auxiliary port that receives a third pressure working fluid that is greater than the first pressure working fluid and is different from the second pressure working fluid, and
  wherein the controller:
    determines whether any of the plurality of evaporators is operating to provide climate control within a third temperature range that is different from the fresh temperature range and the frozen temperature range, and
    for each of the plurality of evaporators operating to provide climate control within the third temperature range, instructs a suction flow control device downstream of the corresponding evaporator to direct the working fluid from the corresponding evaporator to the second auxiliary suction port.

Aspect 11. A method for operating a climate control circuit of a transport climate control system that provides climate control to a climate controlled space of a transport unit, the method comprising:
  obtaining climate control operation data for the transport climate control system;
  monitoring a measured parameter within the transport unit;
  a controller determining whether each of a plurality of evaporators is operating to provide climate control within a fresh temperature range or operating to provide climate control within a frozen temperature range;
  for each of the plurality of evaporators operating to provide climate control within the fresh temperature range, the controller instructing a suction flow control device downstream of the corresponding evaporator to direct the working fluid from the corresponding evaporator to the auxiliary suction port, and
  for each of the plurality of evaporators operating to provide climate control within the frozen temperature range, the controller instructing the suction flow control device to direct the working fluid to the main suction port.

Aspect 12. The method of aspect 11, further comprising:
  the controller determining whether the transport climate control system is operating in a steady-state setting based on the climate control operation data; and
  the controller instructing the suction flow control device to direct the working fluid from each of the plurality of evaporators to the main suction port when the controller determines that the transport climate control system is not operating in the steady-state setting.

Aspect 13. The method of either one of aspects 11 and 12, further comprising:
  the controller determining whether the transport climate control system is operating in a steady-state setting based on the climate control operation data; and
  when the controller determines that the transport climate control system is operating in the steady-state setting:
    the controller instructing the suction flow control device downstream of the corresponding evaporator to direct the working fluid from the corresponding evaporator to the auxiliary suction port for each of the plurality of evaporators operating to provide climate control within the fresh temperature range, and
    the controller instructing the suction flow control device to direct the working fluid to the main suction port for each of the plurality of evaporators operating to provide climate control within the frozen temperature range.

Aspect 14. The method of any one of aspects 11-13, further comprising:
  the controller determining whether all of the plurality of evaporators are operating to provide climate control within the fresh temperature range or all of the plurality of evaporators are operating to provide climate control within a frozen temperature range; and
  the controller instructing the suction flow control device to direct the working fluid to the main suction port for all of the plurality of evaporators when the controller determines that all of the plurality of evaporators are operating to provide climate control within the fresh temperature range or determines that all of the plurality of evaporators are operating to provide climate control within a frozen temperature range.

Aspect 15. The method of aspect 14, further comprising:
the controller instructing an economizer suction line solenoid valve to open that allows a portion of the working fluid to pass through an economizer suction line path to activate an economizer heat exchanger, bypass the plurality of evaporators and the suction flow control device, and flow to the auxiliary suction port when the controller determines that all of the plurality of evaporators are operating to provide climate control within the fresh temperature range or determines that all of the plurality of evaporators are operating to provide climate control within a frozen temperature range.

Aspect 16. The method of any one of aspects 11-15, further comprising:
the controller determining whether the transport climate control system is operating as a multi-zone transport climate control system, and
the controller instructing the suction flow control device to direct the working fluid to the main suction port for all of the plurality of evaporators when the controller determines that the transport climate control system is not operating as a multi-zone transport climate control system.

Aspect 17. The method of any one of aspects 11-16, further comprising:
a controller determining whether any of the plurality of evaporators is operating to provide climate control within a third temperature range that is different from the fresh temperature range and the frozen temperature range; and
for each of the plurality of evaporators operating to provide climate control within the third temperature range, the controller instructing a suction flow control device downstream of the corresponding evaporator to direct the working fluid from the corresponding evaporator to a second auxiliary suction port.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A climate control circuit for a transport climate control system that provides climate control to a climate controlled space of a transport unit, the climate control circuit comprising:
a compressor for compressing working fluid, the compressor including a discharge port that discharges working fluid out of the compressor, a main suction port that receives a first pressure working fluid, and an auxiliary suction port that receives a second pressure working fluid that is greater than the first pressure working fluid;
a condenser, downstream of the compressor, that releases heat from the working fluid into ambient air outside of the transport unit to cool and condense the working fluid;
a plurality of expansion valves, downstream of the condenser, each of the plurality of expansion valves controlling the amount of the working fluid directed to a corresponding evaporator of a plurality of evaporators;
the plurality of evaporators, each of the plurality of evaporators downstream of a corresponding expansion valve of the plurality of expansion valves, each of the plurality of evaporators absorbs heat from a different area of the climate controlled space to heat and evaporate the working fluid;
a suction flow control device downstream of each of the plurality of evaporators, wherein the suction flow control device includes a valve arrangement that is configured to direct the working fluid from each of the plurality of evaporators to one of the main suction port and the auxiliary port; and
a controller that:
determines whether each of the plurality of evaporators is operating to provide climate control within a fresh temperature range or operating to provide climate control within a frozen temperature range,
for each of the plurality of evaporators operating to provide climate control within the fresh temperature range instructs the suction flow control device to direct the working fluid from the corresponding evaporator to the auxiliary suction port,
for each of the plurality of evaporators operating to provide climate control within the frozen temperature range instructs the suction flow control device to direct the working fluid to the main suction port,
determines that each of the plurality of evaporators operating to provide climate control within the frozen temperature range has reached a set-point temperature, and
upon determining that each of the plurality of evaporators operating to provide climate control within the frozen temperature range has reached the set-point temperature, instructs the valve arrangement of the suction flow control device to direct the working fluid passing through each of the plurality of evaporators operating to provide climate control within the fresh temperature range from the auxiliary suction port to the main suction port.

2. The climate control circuit of claim 1, wherein the suction flow control device is a plurality of independent suction flow control devices, each of the plurality of independent suction flow control devices is downstream of a corresponding evaporator of the plurality of the evaporators, each of the plurality of independent suction flow control devices including the valve arrangement that is configured to direct the working fluid from the corresponding evaporator to one of the main suction port and the auxiliary port.

3. The climate control circuit of claim 2, wherein each of the plurality of independent suction flow control devices includes:
a main suction port solenoid valve configured to open when the working fluid is to be directed to the main suction port and configured to close when the working fluid is to be directed to the auxiliary suction port, and
an auxiliary suction port solenoid valve configured to open when the working fluid is to be directed to the auxiliary suction port and configured to close when the working fluid is to be directed to the main suction port.

4. The climate control circuit of claim 2, wherein each of the plurality of independent suction flow control devices includes:
a solenoid valve configured to open when the working fluid is to be directed to the main suction port and configured to close when the working fluid is to be directed to the auxiliary suction port, and
a check valve configured to prevent the working fluid from travelling from the auxiliary suction port back through the suction flow control device and back to the corresponding evaporator.

5. The climate control circuit of claim 2, wherein each of the plurality of independent suction flow control devices includes a three way valve having an input port, a main output port and an auxiliary output port, wherein the three way valve is configured to open the main output port and close the auxiliary output port when the working fluid is to be directed to the main suction port and configured to close the main output port and open the auxiliary output port when the working fluid is to be directed to the auxiliary suction port.

6. The climate control circuit of claim 1, wherein the compressor is a positive displacement compressor configured to compress working fluid in multiple stages.

7. The climate control circuit of claim 1, further comprising:
an economizer heat exchanger downstream of the condenser and upstream of the plurality of evaporators; and
an economizer suction line path that directs a portion of the working fluid from the economizer heat exchanger to the auxiliary suction port, bypassing the plurality of evaporators and the suction flow control device.

8. The climate control circuit of claim 1, further comprising a liquid receiver downstream of the condenser and upstream of the plurality of expansion valves, wherein the liquid receiver holds working fluid within the climate control circuit.

9. The climate control circuit of claim 1, further comprising a filter drier downstream of the condenser and upstream of the plurality of expansion valves, wherein the filter drier provides dehumidification and physical filtration of system contaminants from the working fluid.

10. The climate control circuit of claim 1, wherein the compressor includes a second auxiliary port that receives a third pressure working fluid that is greater than the first pressure working fluid and is different from the second pressure working fluid, and
wherein the controller:
determines whether any of the plurality of evaporators is operating to provide climate control within a third temperature range that is different from the fresh temperature range and the frozen temperature range, and
for each of the plurality of evaporators operating to provide climate control within the third temperature range, instructs a suction flow control device downstream of the corresponding evaporator to direct the working fluid from the corresponding evaporator to the second auxiliary suction port.

11. The climate control circuit of claim 1, wherein, upon the valve arrangement of the suction flow control device directing the working fluid passing through each of the plurality of evaporators operating to provide climate control within the fresh temperature range to the main suction port, the controller is configured to instruct one or more liquid line solenoid valves corresponding to each of the plurality of evaporators operating to provide climate control within the frozen temperature range to close.

12. A method for operating a climate control circuit of a transport climate control system that provides climate control to a climate controlled space of a transport unit, the method comprising:
a controller determining whether each of a plurality of evaporators is operating to provide climate control within a fresh temperature range or operating to provide climate control within a frozen temperature range;
for each of the plurality of evaporators operating to provide climate control within the fresh temperature range, the controller instructing a valve arrangement of a suction flow control device downstream of the corresponding evaporator to direct the working fluid from the corresponding evaporator to an auxiliary suction port;
for each of the plurality of evaporators operating to provide climate control within the frozen temperature range, the controller instructing the valve arrangement of the suction flow control device to direct the working fluid to a main suction port;
the controller determining that each of the plurality of evaporators operating to provide climate control within the frozen temperature range has reached a set-point temperature; and
upon determining that each of the plurality of evaporators operating to provide climate control within the frozen temperature range has reached the set-point temperature, the controller instructing the valve arrangement of the suction flow control device to direct the working fluid passing through each of the plurality of evaporators operating to provide climate control within the fresh temperature range from the auxiliary suction port to the main suction port.

13. The method of claim 12, further comprising:
the controller determining whether the transport climate control system is operating in a steady-state setting based on the climate control operation data; and
the controller instructing the suction flow control device to direct the working fluid from each of the plurality of evaporators to the main suction port when the controller determines that the transport climate control system is not operating in the steady-state setting.

14. The method of claim 12, further comprising:
the controller determining whether the transport climate control system is operating in a steady-state setting based on the climate control operation data; and
when the controller determines that the transport climate control system is operating in the steady-state setting:
the controller instructing the suction flow control device downstream of the corresponding evaporator to direct the working fluid from the corresponding evaporator to the auxiliary suction port for each of the plurality of evaporators operating to provide climate control within the fresh temperature range, and
the controller instructing the suction flow control device to direct the working fluid to the main suction port for each of the plurality of evaporators operating to provide climate control within the frozen temperature range.

15. The method of claim 12, further comprising:
the controller determining whether all of the plurality of evaporators are operating to provide climate control within the fresh temperature range or all of the plurality of evaporators are operating to provide climate control within a frozen temperature range; and
the controller instructing the suction flow control device to direct the working fluid to the main suction port for all of the plurality of evaporators when the controller determines that all of the plurality of evaporators are operating to provide climate control within the fresh temperature range or determines that all of the plurality of evaporators are operating to provide climate control within a frozen temperature range.

16. The method of claim 15, further comprising:
the controller instructing an economizer suction line solenoid valve to open that allows a portion of the working fluid to pass through an economizer suction line path to activate an economizer heat exchanger, bypass the plurality of evaporators and the suction flow control device, and flow to the auxiliary suction port when the controller determines that all of the plurality of evaporators are operating to provide climate control within the fresh temperature range or determines that all of the plurality of evaporators are operating to provide climate control within a frozen temperature range.

17. The method of claim 12, further comprising:
the controller determining whether the transport climate control system is operating as a multi-zone transport climate control system, and
the controller instructing the suction flow control device to direct the working fluid to the main suction port for all of the plurality of evaporators when the controller determines that the transport climate control system is not operating as a multi-zone transport climate control system.

18. The method of claim 11, further comprising:
a controller determining whether any of the plurality of evaporators is operating to provide climate control within a third temperature range that is different from the fresh temperature range and the frozen temperature range; and
for each of the plurality of evaporators operating to provide climate control within the third temperature range, the controller instructing a suction flow control device downstream of the corresponding evaporator to direct the working fluid from the corresponding evaporator to a second auxiliary suction port.

19. The method of claim 12, further comprising:
upon the valve arrangement of the suction flow control device directing the working fluid passing through each of the plurality of evaporators operating to provide climate control within the fresh temperature range to the main suction port, the controller instructing one or more liquid line solenoid valves corresponding to each of the plurality of evaporators operating to provide climate control within the frozen temperature range to close.

* * * * *